United States Patent
Gertitschke et al.

(10) Patent No.: US 9,233,523 B2
(45) Date of Patent: Jan. 12, 2016

(54) DEVICE FOR ROLL-SEALING SHEETS

(71) Applicant: UHLMANN PAC-SYSTEME GMBH & CO. KG, Laupheim (DE)

(72) Inventors: Detlev Gertitschke, Laupheim (DE); Juergen Liebhardt, Laupheim (DE); Robert Lehmann, Gundelfingen (DE)

(73) Assignee: Uhlmann Pac-Systeme GMBH & Co. KG, Laupheim (DE)

( * ) Notice: Subject to any disclaimer, the term of this patent is extended or adjusted under 35 U.S.C. 154(b) by 322 days.

(21) Appl. No.: 13/875,040

(22) Filed: May 1, 2013

(65) Prior Publication Data
US 2013/0299092 A1 Nov. 14, 2013

(30) Foreign Application Priority Data
May 14, 2012 (EP) ..................................... 12167924

(51) Int. Cl.
*B32B 37/00* (2006.01)
*B29C 65/36* (2006.01)
*B29C 65/00* (2006.01)

(52) U.S. Cl.
CPC ........... *B32B 37/0053* (2013.01); *B29C 65/368* (2013.01); *B29C 65/3656* (2013.01); *B29C 65/3668* (2013.01); *B29C 66/112* (2013.01); *B29C 66/131* (2013.01); *B29C 66/3472* (2013.01); *B29C 66/53461* (2013.01);
(Continued)

(58) Field of Classification Search
CPC ............ B29C 65/3656; B29C 65/3668; B29C 65/368; B29C 66/0242; B29C 66/112; B29C 66/131; B29C 66/3472; B29C 66/53461; B29C 66/72321; B29C 66/72328; B29C 66/81465; B29C 66/81469; B29C 66/83411; B29C 66/83413; B29C 66/83511; B29C 66/91216; B29C 66/91221; B29C 66/91411; B29C 66/91413; B29C 66/91651; B29C 66/91655; B29C 66/9192; B29C 66/92611; B29C 66/93; B29C 66/961; B32B 37/0053; B32B 41/00
USPC .................. 156/359, 378, 555, 366, 367, 368
See application file for complete search history.

(56) References Cited

U.S. PATENT DOCUMENTS

2006/0049173 A1* 3/2006 Gertitschke et al. .......... 219/528
2007/0186511 A1* 8/2007 Hultberg et al. ................ 53/433

FOREIGN PATENT DOCUMENTS

EP 0731027 A1 9/1996
EP 2070687 A1 6/2009
(Continued)

OTHER PUBLICATIONS

EP Search Report References for EP 12167924.

*Primary Examiner* — George Koch
(74) *Attorney, Agent, or Firm* — Brinks Gilson & Lione

(57) ABSTRACT

The device for sealing together a formed bottom sheet and a lidding sheet between a feed roll and a sealing roll has a heating unit for preheating the lidding sheet before the sealing operation. The heating unit is a contactless induction heating device which has coils and magnetic-field influencing elements which are arranged transversely to the travel direction of the lidding sheet and opposite at least one of the coils. The distance between each of the magnetic-field influencing elements and the at least one coil is adjusted by a control unit on the basis of measurement values of temperature sensors arranged downstream of the magnetic-field influencing elements in order to regulate the temperature profile of the lidding sheet.

14 Claims, 8 Drawing Sheets

(52) U.S. Cl.
CPC ..... *B29C66/72321* (2013.01); *B29C 66/72328* (2013.01); *B29C 66/81465* (2013.01); *B29C 66/81469* (2013.01); *B29C 66/83411* (2013.01); *B29C 66/83413* (2013.01); *B29C 66/83511* (2013.01); *B29C 66/9192* (2013.01); *B29C 66/91216* (2013.01); *B29C 66/91221* (2013.01); *B29C 66/91411* (2013.01); *B29C 66/91651* (2013.01); *B29C 66/91655* (2013.01); *B29C 66/92611* (2013.01); *B29C 66/961* (2013.01); *B29C 66/0242* (2013.01); *B29C 66/91413* (2013.01); *B29C 66/93* (2013.01)

(56) References Cited

FOREIGN PATENT DOCUMENTS

| GB | 1161901 A | 8/1969 |
|---|---|---|
| WO | WO 2009/103981 A1 | 8/2009 |

\* cited by examiner

DEVICE FOR ROLL-SEALING SHEETS

RELATED APPLICATIONS

The present patent document claims the benefit of priority to European Patent Application No. EP 12167924.5, filed May 14, 2012, the entire contents of each of which are incorporated herein by reference.

FIELD AND BACKGROUND OF THE INVENTION

The present invention relates to a device for roll-sealing sheets, especially a formed bottom sheet comprising small pockets filled with pharmaceutical products, to a lidding sheet by means of heat-sealing in a so-called thermoforming machine. The formed bottom sheet and the lidding sheet are conducted between a feed roll and a sealing roll, which presses with a sealing force against the feed roll and thus seals the sheets together to form a sealed composite sheet structure.

To be able to process all types of lidding sheets at high web speeds during a continuous roll-sealing operation with the use of a feed roll and a heatable sealing roll, it is necessary to install a preheating unit upstream of the actual sealing operation. The use of a preheating step has the effect of increasing the time available for heating the lidding sheet to the sealing temperature. The lidding sheet usually consists of aluminum foil coated with a heat-seal lacquer. Lidding sheets in which, in addition, the outside surface of the aluminum foil is laminated to a layer of paper are being used increasingly for child-proof blister packs. Because paper is a poor conductor of heat, however, achieving a high processing output requires a longer preheating time to heat the sealing lacquer to the melting point before the lidding sheet enters the sealing station.

None of the preheating units used in conjunction with aluminum foil is suitable for processing the paper layer, however, because none of them can provide sufficient heat output within a short period of time. When the paper side is being heated by one of the known preheating units, it is necessary to run at a very high temperature to achieve a high processing output. This can lead to undesirable brown discoloration of the paper layer, especially when the thermoforming machine is being started and stopped.

When contact heating is used to increase the temperature, the temperature must remain below the melting point of the sealing lacquer, because otherwise the lacquer can be damaged. There is also the danger that particles will settle on the contact surface of the preheating unit and that these particles will then come loose during production and turn up inside the package.

The known preheating units such as contact heaters, furthermore, have a great deal of thermal inertia because of their considerable mass, and for this reason it is not possible to change the production speed quickly when such preheaters are used.

SUMMARY OF THE INVENTION

It is therefore an object of the present invention to provide a device for roll-sealing sheets, in which the heating unit for preheating the lidding sheet avoids damage to the lidding sheet structure, can be regulated quickly and precisely to take different production speeds into account, can be adjusted flexibly to sheets of different widths, and is compact and simple in design.

According to an aspect of the invention, the device for roll-sealing sheets comprises:
 a feed roll and a sealing roll, which presses with a sealing force against the feed roll, wherein a formed bottom sheet and a lidding sheet are conducted between the sealing roll and the feed roll and sealed together to form a sealed composite sheet structure; and
 a heating unit for preheating the lidding sheet before the sealing operation, wherein the heating unit is designed as a contactless induction heating device comprising:
  a plurality of coils arranged one after the other in the travel direction of the lidding sheet;
  a plurality of magnetic-field influencing elements arranged transversely to the travel direction of the lidding sheet and opposite at least one of the coils, wherein a transport channel for the lidding sheet is formed between the at least one coil and the magnetic-field influencing elements, wherein the distance between each of the magnetic-field influencing elements and the at least one coil can be adjusted by an actuating drive;
  a plurality of temperature sensors arranged transversely to the travel direction of the lidding sheet and downstream of the magnetic-field influencing elements to detect the temperature profile of the lidding sheet; and
  a control unit, which is able, on the basis of the measurement values supplied by the temperature sensors, to regulate the temperature profile of the lidding sheet by changing the distance between the individual magnetic-field influencing elements and the at least one coil.

The main metallic layer of the lidding sheet is heated directly and without contact by the contactless induction heating unit as a result of the alternating magnetic field and the eddy currents generated in the metallic layer. The sealing lacquer layer, the paper layer, and any other layers which may be present on the main layer such as a protective lacquer layer are thus heated as well. The magnetic-field influencing elements situated opposite the coils bundle the alternating magnetic field and thus change the heating action in the lidding sheet. The individually adjustable distances between magnetic-field influencing elements and the coil (or coils) make it possible to change or increase the magnetic flux and thus in particular to produce a homogeneous temperature distribution over the entire width of the lidding sheet and to adjust that distribution specifically to lidding sheets of different widths. The temperature sensors arranged downstream of the magnetic-field influencing elements supply the control variable of the automatic temperature control circuit operated by the control unit and measure the temperature profile as close as possible to the place where the lidding sheet comes in contact with the sealing roll. The temperature within the lidding sheet can be increased in a stepwise fashion by means of the several coils arranged one after the other in the travel direction. The thermal mass of the elements of the induction heating unit to be heated is very small, and for this reason the device can regulate the temperature distribution in the lidding sheet very quickly and easily. The design with several coils, adjustable magnetic-field influencing elements opposite them, and temperature sensors is relatively simple.

In a preferred embodiment, the control unit is adapted to control automatically the temperature profile of the lidding sheet by changing the current through one or more of the coils and/or by changing the distance between the coils and the magnetic-field influencing elements. When several coils are arranged one after the other in the travel direction of the lidding sheet, the temperature can be increased gradually or in steps. This may be done, for example, by increasing the inductive heating output per coil by a certain amount from one coil to the next in the travel direction. Alternatively, it is possible to control automatically the temperature increase within the lidding sheet by changing the distance of the coils from the magnetic-field influencing elements or from the lidding sheet in accordance with the material conditions and heating requirements.

Each coil is preferably wound around a magnetic core such as an E-shaped ferrite core. Using ferrite as the core of the coil increases the inductance. Thus, as the current passes through the coil, the magnetic flux density through the lidding sheet is increased. As a result, the heating output of the coil of the induction heating unit is increased. Other alternative forms of a magnetic core are also possible such as a C-shaped core, a K-shaped core, and the like. Besides ferrites, it is also possible to use other suitable magnetic materials.

It is especially advantageous for the windings of one or more of the coils to extend at least over the width of the lidding sheet. Thus guarantees that the magnetic field will flow through the entire width of the lidding sheet, which will thus be heated. It is also conceivable that the coils do not extend over the entire width but rather supplement or overlap each other transversely to the travel direction. The temperature profile of the lidding sheet can thus also be influenced by appropriate arrangement of the coils.

It is especially preferable for the magnetic-field influencing elements to be arranged next to each other in a row. This leads in particular to a compact, simple structure, which offers sufficient flexibility and can be manufactured at acceptable cost. It is also possible to arrange several rows of magnetic-field influencing elements in the travel direction, wherein each magnetic-field influencing element of a certain row is arranged, for example, with an offset to a magnetic-field influencing element of a preceding or following row. It is thus possible to adjust the temperature profile even more precisely to sheets of different widths.

It is also preferable to arrange the temperature sensors next to each other in a row. With respect to the arrangement and selection of the temperature sensors, it is important that the temperature profile be detected as far as possible over the entire width of the lidding sheet. If, for example, the number of magnetic-field influencing elements is the same as the number of temperature sensors, and if the measuring fields are adapted appropriately to the sizes of the magnetic-field influencing elements, then it is relatively easy to control the temperature automatically. It is also conceivable, however, that a larger number of temperature sensors with correspondingly smaller measuring fields could be used in order to increase the accuracy of the measurements.

It is also advantageous for the power densities of the coils to be different and for the current passing through each coil to be controllable individually. As already explained above, it is possible in this way to adjust the temperature increase gradually or in stepwise fashion in the travel direction of the lidding sheet.

The actuating drive for the magnetic-field influencing elements is preferably a servomotor, a stepping motor, a shape-memory alloy actuator, or a hydraulically or pneumatically driven actuator. Drives of this type can be adjusted in very fine increments and are very precise with respect to their positioning, as a result of which it is possible to compensate effectively for irregularities in the temperature profile.

It is also advantageous for the control unit to be adapted to control automatically the temperature of the lidding sheet as a function of the speed at which the sheet is traveling. Because the processing speed of the sealing station will be different depending on the material, size, and product properties, it is essential for the overall production process that it be possible for the automatic temperature control system to adapt quickly to the travel speed of the lidding sheet.

The magnetic-field influencing elements are preferably designed as ferrite elements. Alternatively, other suitable magnetic materials with similar properties can be used.

It is especially advantageous for the temperature sensors to be designed as infrared sensors. This type of temperature sensor is very fast and precise in its measurements, and it does not cause any damage to the lidding sheet, because the temperature is measured without contact.

BRIEF DESCRIPTION OF THE DRAWINGS

Additional advantages and features of the device for roll-sealing sheets can be derived from the following description, which refers to the drawings.

DETAILED DESCRIPTION OF SPECIFIC EMBODIMENTS

Figure 1:
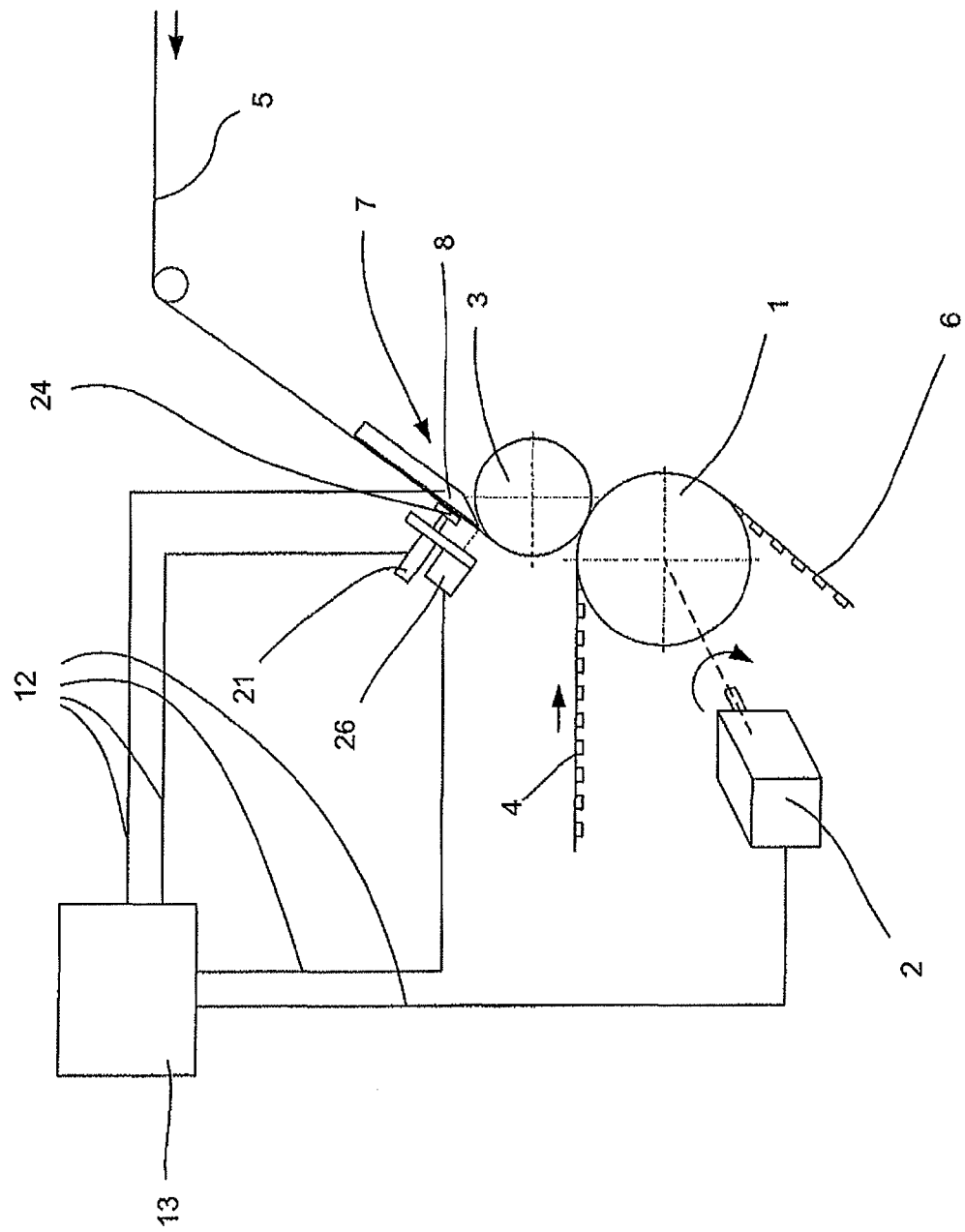
FIG. 1 shows an overall schematic diagram of a device for roll-sealing sheets according to the invention.

FIG. 1 shows a preferred embodiment of the device for roll-sealing sheets according to the invention. Here a formed bottom sheet 4 and a lidding sheet 5 are conducted between a feed roll 1, which is driven in a clockwise direction by a drive 2, and a sealing roll 3 and thus sealed together to form a sealed composite sheet structure 6. The formed bottom sheet 4 comprises a plurality of pockets, which have been filled with products such as tablets and are sealed by the sealing operation.

Before the lidding sheet 5 arrives at the sealing roll 3, which, in the embodiment shown here, is rotating in the counterclockwise direction, it is preheated to a predetermined temperature by an induction heating unit 7. The induction heating unit 7 is described in greater detail below with reference to the additional figures. FIG. 1 shows in schematic fashion a housing 8, which contains the coils (not shown), located on the side of the lidding sheet 5 facing the sealing roll 3. The figure also shows, in schematic fashion, an actuating drive 21 on the other side of the lidding sheet 5. This motor is used to adjust the distance between the magnetic-field influencing elements 10 and the lidding sheet 5. A temperature sensor 26 can also be seen. The drive 2 of the feed roll, the coils in the housing 8, the actuating drives 21, and the temperature sensors 26 are connected by lines 12 to the control unit 13.

Figure 2:
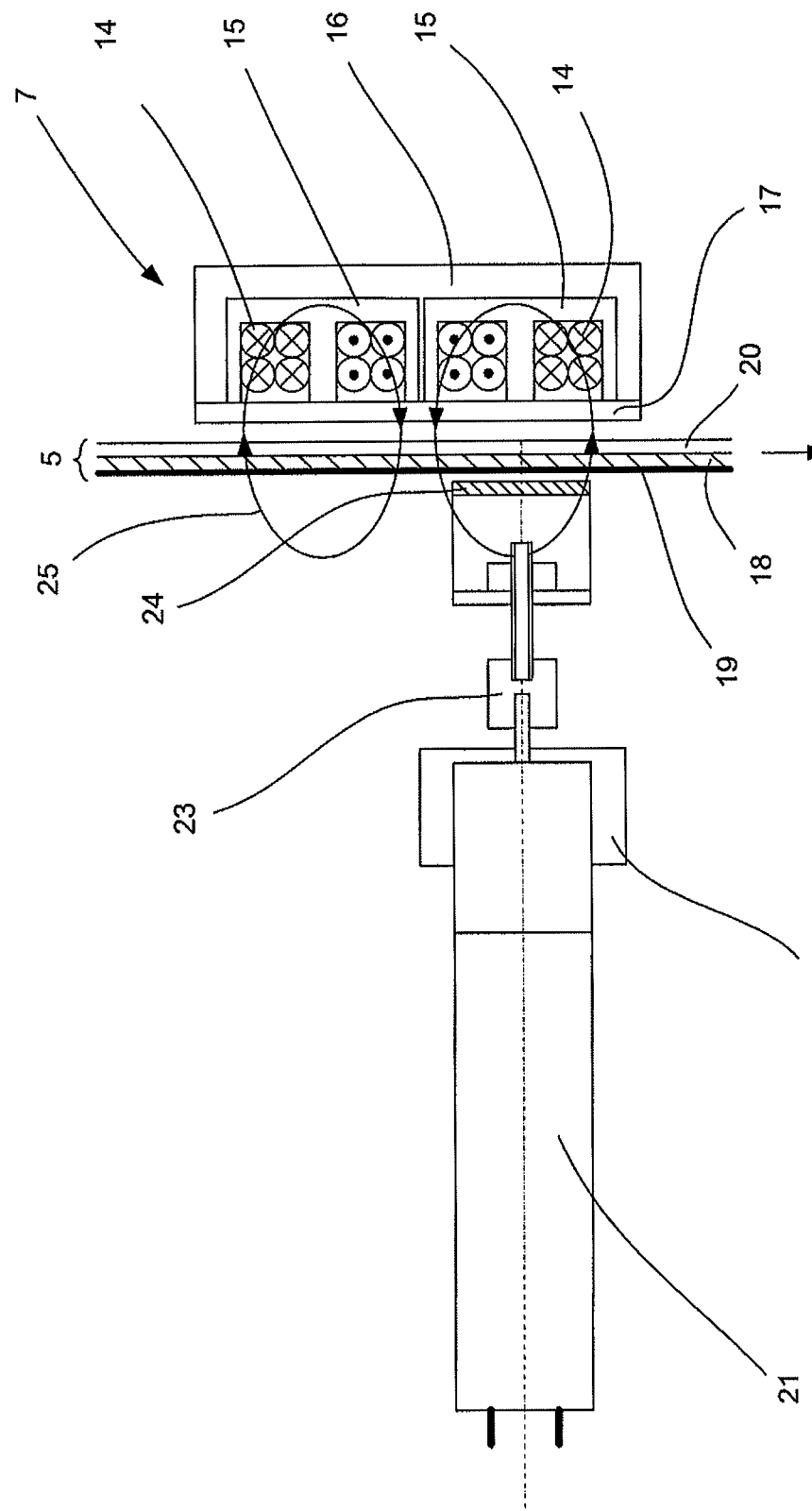
FIG. 2 is a cross-sectional view of part of a preferred embodiment of the device for roll-sealing sheets according to the invention, in which the action of the induction heating unit on the lidding sheet is illustrated.

FIG. 2 shows a schematic cross-sectional view of part of the induction heating unit 7 of the preferred embodiment of the device for roll-sealing sheets. On the right side of the lidding sheet 5 in FIG. 2, two coils 14 are depicted, the windings of which are perpendicular to the plane of the drawing. Generally, the windings of the coils 14 are arranged in a plane substantially parallel to the travel direction of the lidding sheet 5. The coils 14 are wound around E-shaped ferrite cores 15 and are arranged in a housing 16. A nonmetallic protective sheet 17 is attached to the housing 16 on the side facing the lidding sheet 5 to protect the coils 14 from dirt and damage.

In the embodiment shown here, the lidding sheet 5 itself consists of aluminum foil 18, shown with shading in FIG. 2, onto one side of which a sealing lacquer 19 has been applied, whereas a paper layer 20 is bonded by a protective lacquer to the other side. The lidding sheet 5 moves at a certain process speed in the travel direction, indicated by the downward-pointing arrow in FIG. 2.

On the side of the lidding sheet 5 on the left in FIG. 2, an actuating drive 21 is depicted, which is mounted on a crossbeam 22. By way of a coupling 23, the actuating drive 21 moves a magnetic-field influencing element 24 perpendicularly to the travel direction of the lidding sheet 5. The magnetic-field influencing element 24 has as a ferrite element arranged next to the lidding sheet 5.

When alternating current of a certain frequency flows through the coils 14, an alternating magnetic field is generated in the area of the lidding sheet 5 by each coil 14, the magnetic flux lines 25 of these fields being illustrated schematically in FIG. 2. The magnetic-field influencing element 24, designed as a ferrite element, acts on the alternating magnetic field, as will be described in greater detail further below. The alternating magnetic field induces eddy currents in the aluminum foil 18; these currents in turn heat the aluminum material by ohmic resistance. The heating of the aluminum foil 18 has the effect of also heating the sealing lacquer 19 and the protectively lacquered paper layer 20, which are in contact with the aluminum foil 18.

Figure 3:
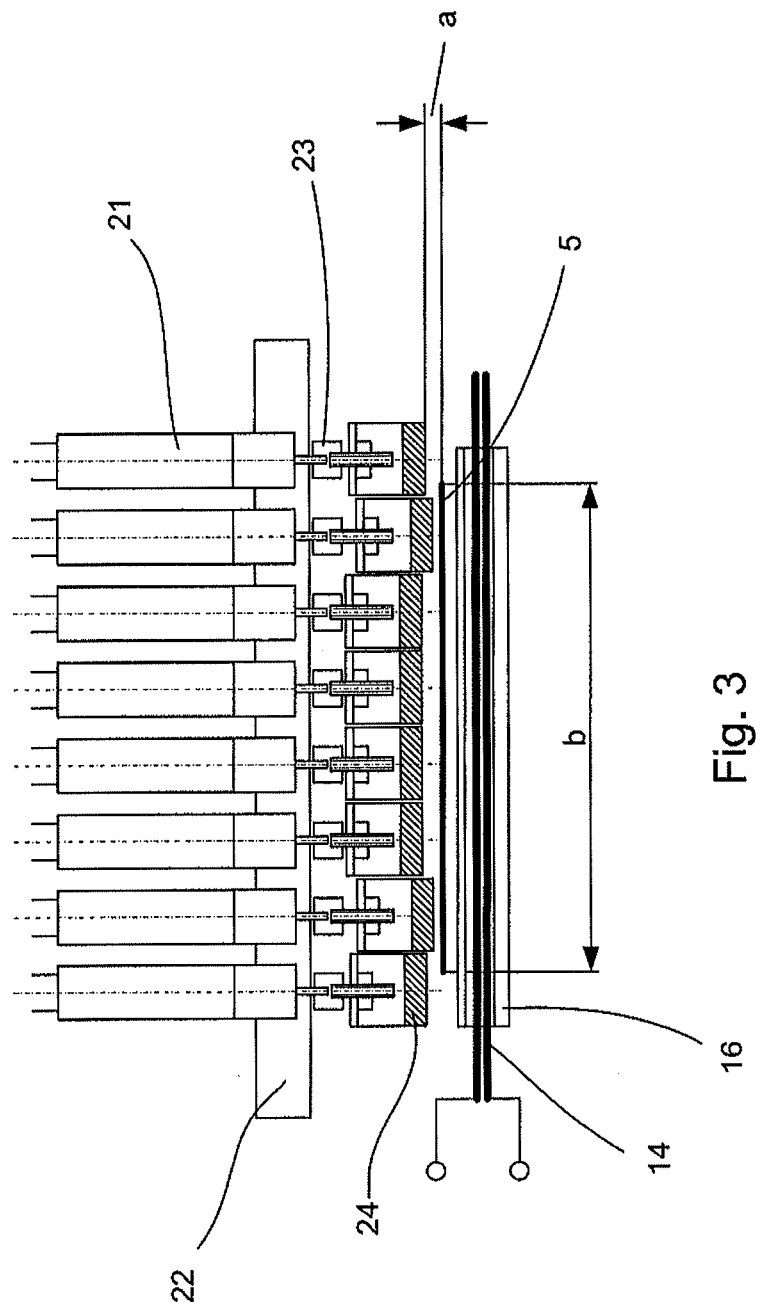
FIG. 3 is a cross-sectional diagram of parts of the preferred embodiment of the device for roll-sealing sheets according to the invention.

FIG. 3 is a cross-sectional view of the induction heating unit 7 of the device for roll-sealing sheets in the embodiment of FIG. 2, wherein the cross-sectional plane is perpendicular to the travel direction of the lidding sheet 5. Underneath the lidding sheet 5, a coil 14 is arranged in the housing 16, wherein the housing 16 can hold more than one coil 14, arranged one after the other in a row in the travel direction. In the preferred embodiment described here, three coils 14 are present in the housing 16. The coils 14 extend beyond the width b of the lidding sheet 5. Above the lidding sheet 5 in FIG. 3, eight actuating drives 21 are mounted on the crossbeam 22. Each of these actuating drives 21, acting by way of couplings 23, is able to adjust the height of one of the eight magnetic-field influencing elements 24, that is, to adjust the distance a between the magnetic-field influencing element 24 and the lidding sheet 5. It can be seen that two of the magnetic-field influencing elements 24 are positioned somewhat closer to the lidding sheet 5, one in each of the two edge areas of the lidding sheet 5. As already described with reference to FIG. 2 above, the magnetic-field influencing elements 24, which are designed here preferably as ferrite elements, act in such a way that the strength of the alternating magnetic fields generated by the coils 14 is increased in the area of the magnetic-field influencing elements 24. Thus the heating action of the alternating magnetic field in the lidding sheet 5, i.e., in its aluminum layer, is also increased. It is also true that, the shorter the distance a between the magnetic-field influencing element 24 and the lidding sheet 5, the stronger the heating action in the area of the lidding sheet 5 closest to the magnetic-field influencing element 24. The magnetic field is thus subject to a shaping action when the magnetic-field influencing elements 24 are moved. In this way, by suitable adjustment of the distance a between each individual magnetic-field influencing element 24 and the lidding sheet 5, the temperature profile of the lidding sheet 5 can be adjusted or automatically regulated over its entire width b, as will be described below. "Temperature profile" in this context also covers uniform (constant) temperature profiles, possibly at different temperatures. Adjusting the temperature profile therefore can encompass adjusting the temperature in just an area of the lidding sheet 5 or over the entire width of the lidding sheet 5.

Eight actuating drives 21 and eight magnetic-field influencing elements 24 have been selected in the exemplary embodiment shown here, but these numbers could be different, depending on, for example, the type of actuating drives 21 being used.

Figure 4:
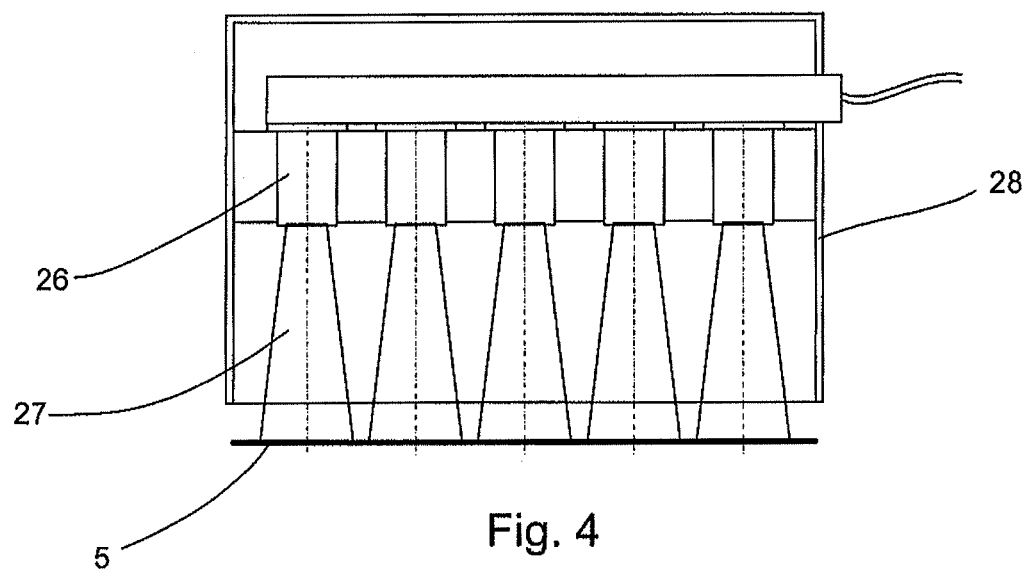
FIG. 4 shows an arrangement of the temperature sensors of the preferred embodiment of the device for roll-sealing sheets according to the invention.

In a view perpendicular to the travel direction of the lidding sheet 5, FIG. 4 is a cross section through a row of temperature sensors 26, which are arranged next to each other in a row and mounted in a housing 28. In the preferred embodiment, the sensors are designed as infrared sensors, which measure the temperature without contact. Like the row of magnetic-field influencing elements 24, the temperature sensors 26 are arranged in a row transversely to the travel direction of the lidding sheet and are spaced equally apart. Each temperature sensor 26 comprises a detection cone 27, which covers a predetermined measurement acquisition area of the lidding sheet 5, here a circular area, where it measures the temperature. The row of temperatures sensors 26 is arranged above the lidding sheet 5, directly adjacent to, and downstream from, the magnetic-field influencing elements 24, so that the sensors can measure the temperature profile of the lidding sheet 5 as close as possible to the alternating magnetic field and to the effect produced by that field. The temperature sensors 26 do not have to be perpendicular to the lidding sheet 5. It is also possible for the temperature sensors 26 to be set up at an angle to the lidding sheet 5. This makes it is possible to position them even closer to the area where the material of the lidding sheet 5 is heated. Nor do the temperature sensors 26 necessarily have to be arranged next to each other in a row.

Figure 5:
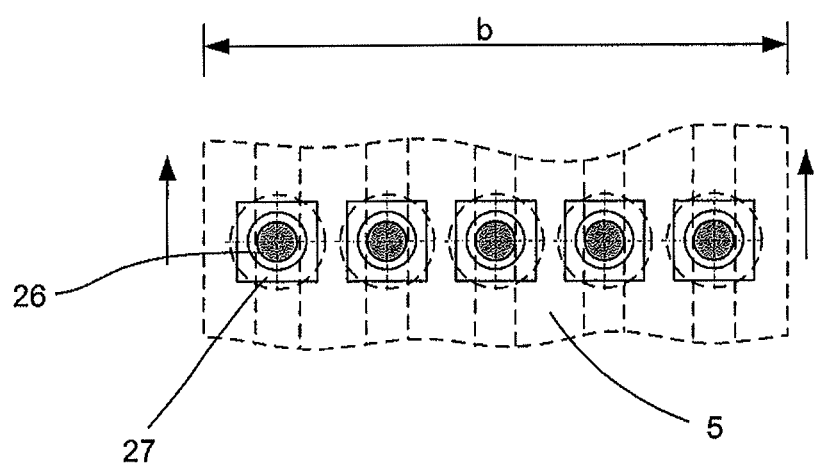
FIG. 5 is a top view of the temperature sensors of FIG. 4.

FIG. 5 is a top view of the arrangement of the temperature sensors 26 of FIG. 4, wherein the arrow indicates that the lidding sheet 5 is traveling toward the top of the page. It can be seen from FIG. 5 that the row of adjacent temperature sensors 26 detects the temperature over almost the entire width b of the lidding sheet 5.

The function of the device for roll-sealing sheets is described in detail below on the basis of FIGS. 6-8.

Figure 6:
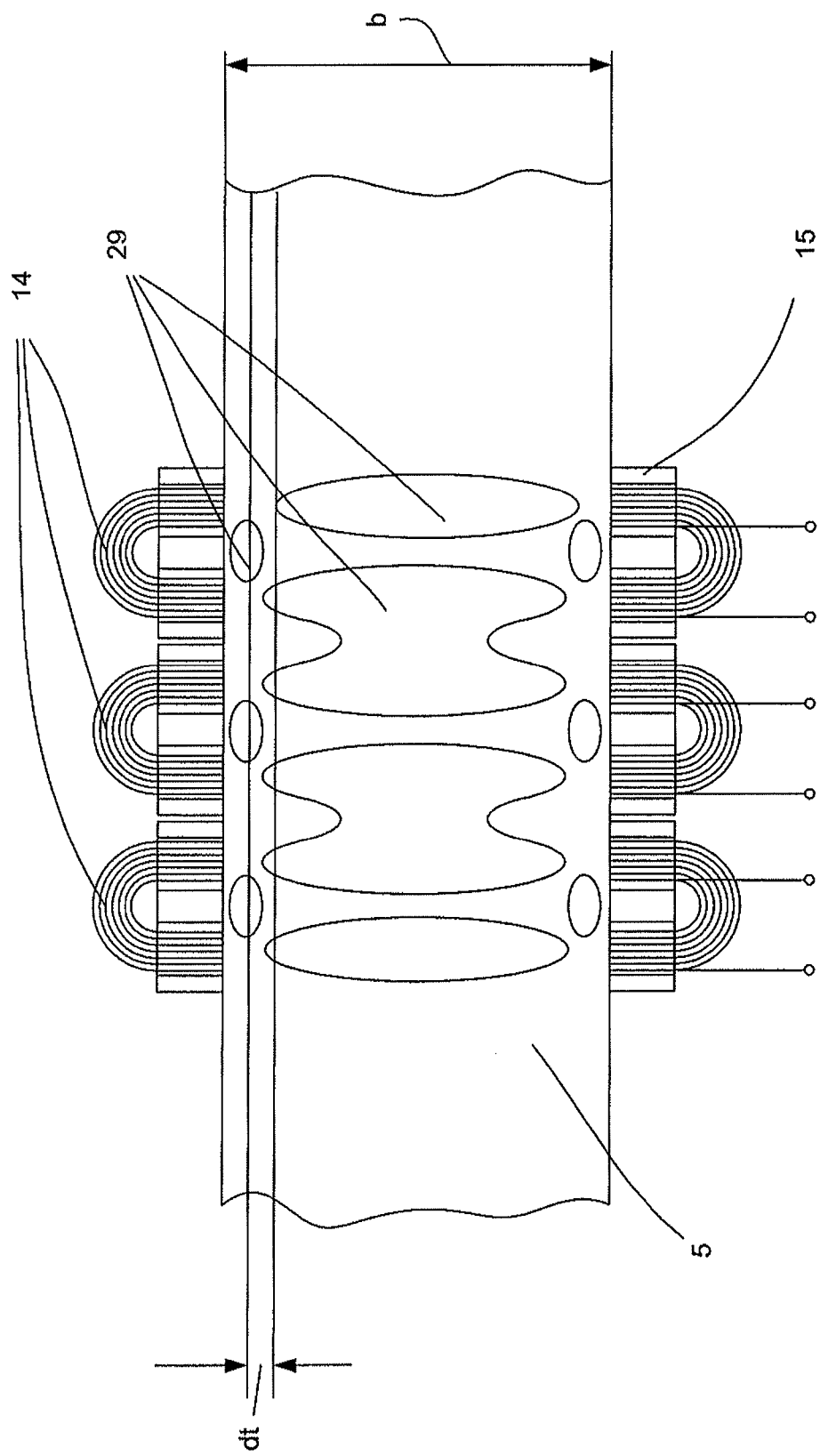
FIG. 6 is a top view of the temperature distribution, on a stationary lidding sheet, produced by the magnetic field of the coils without the action of the magnetic-field influencing elements.

FIG. 6 shows in schematic fashion the temperature distribution on the lidding sheet 5 produced by the alternating magnetic fields of the three coils 14, while the lidding sheet 5 is stationary. It should be noted here that this static state does not represent the normal operating state of the device for roll-sealing sheets; it merely serves to facilitate the explanation of the present invention.

It is possible to see temperature fields 29 on the lidding sheet 5. These fields are drawn in the manner of profile lines, that is, a closed line indicates an area with an substantially constant temperature. It is obvious that the temperature distribution transverse to the travel direction, that is, in the direction of the width b of the lidding sheet 5, is not homogeneous or constant. On the contrary, it has areas, especially at the edge of the lidding sheet 5, in which the temperature drops and then increases again farther out. In these edge areas, there is thus a temperature difference dt. In FIG. 6, this zone is characterized by the parallel lines.

Figure 7:
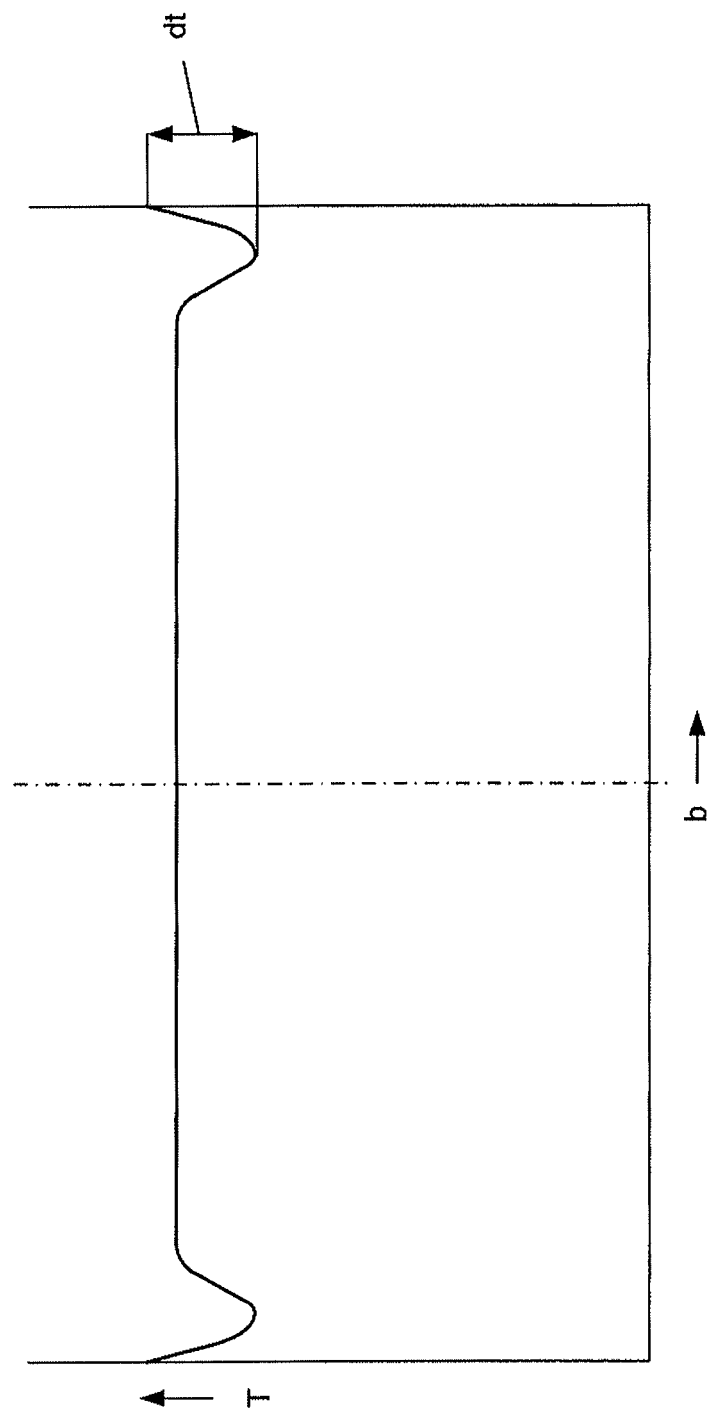
FIG. 7 is a graph of the temperature profile transversely to the travel direction of the lidding sheet, as it is traveling, without the effect of the magnetic-field influencing elements.

FIG. 7 shows this relationship in the form of a graph, wherein the width b of the lidding sheet 5 is plotted on the abscissa and the temperature T on the ordinate. The deviations at the two edges of the lidding sheet 5 from the value in the center are easy to see, wherein the temperature difference has the absolute value dt. An inhomogeneous temperature distribution, i.e., temperature profile, of this type is not acceptable in terms of the reliable preheating of the lidding sheet 5, and for this reason the device for roll-sealing sheets comprises a mechanism which can compensate for these temperature differences and thus provide a homogeneous temperature profile over the entire width of the lidding sheet 5.

By means of the automatic control circuit, which is implemented in the control unit 13, the device according to the invention can react to temperature deviations by adjusting various parameters in correspondence with the measured temperature distribution of the lidding sheet 5. The main parameter is the distance a between each individual magnetic-field influencing element 24 and the lidding sheet 5, especially in the edge areas of the lidding sheet 5 (see FIG. 3). Another adjustable parameter is the distance of the coils 14 from the lidding sheet 5, wherein it is possible, for example, to vary this distance per individual coil 14, so that the coil 14 coming first in the travel direction is the farthest away, whereas the coils 14 following after in the travel direction are progressively closer. It is also possible to vary the strength of the alternating magnetic field generated by the coils 14 in such a way that, for example, the increase in the temperature of the lidding sheet 5 produced by the alternating magnetic field of the first coil 14 is smaller than the temperature increase produced by the coils 14 located farther downstream in the travel direction. It is also possible to control the alternating magnetic field in time as a function of the speed at which the lidding sheet 5 travels.

Figure 8:
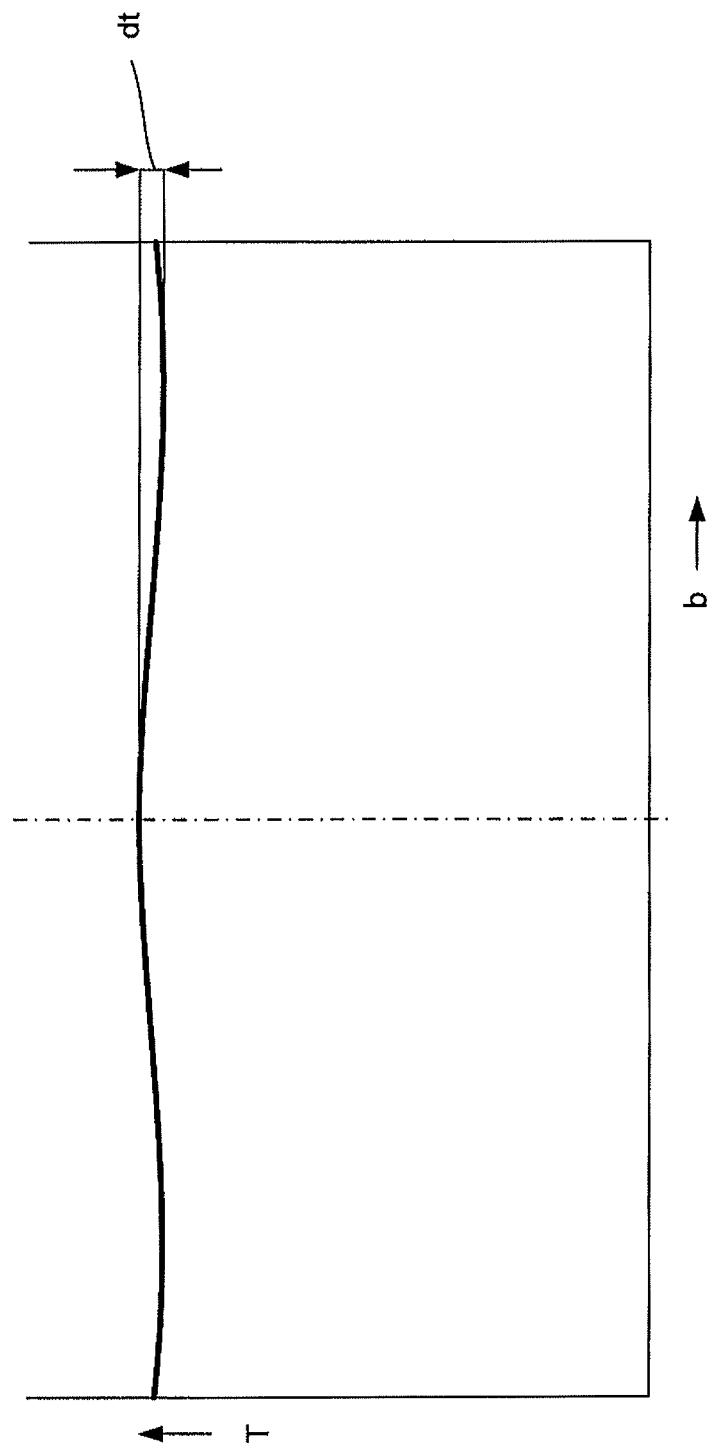
FIG. 8 is a graph of the temperature profile transversely to the travel direction of the lidding sheet, as it is traveling, with the effect of the magnetic-field influencing elements.

FIG. 8 shows the temperature profile or temperature distribution over the entire width b of the lidding sheet 5 during the automatically controlled operation of the device according to the invention, specifically in correspondence with the arrangement of magnetic-field influencing elements 24 shown in FIG. 3. It can be seen that the temperature difference dt in the edge area of the lidding sheet 5 is now much smaller, which means that a substantially homogeneous temperature distribution transverse to the travel direction has been established.

The present invention provides a device for roll-sealing sheets, in which the heating unit for the preheating of the lidding sheet 5 avoids damage to the lidding sheet structure, can be automatically controlled quickly and precisely, can be adapted flexibly to sheets of different width, and is of compact and simple design.

The invention claimed is:

1. A device for roll-sealing sheets comprising:
    a feed roll and a sealing roll which presses with a sealing force against the feed roll to seal together a formed bottom sheet and a lidding sheet conducted between the sealing roll and feed roll to form a sealed composite sheet structure in a sealing operation; and
    a heating unit for preheating the lidding sheet, which is moved in a travel direction, before the sealing operation, the heating unit being a contactless induction heating device and comprising:
    a plurality of coils arranged one after the other in the travel direction of the lidding sheet;
    a plurality of magnetic-field influencing elements arranged transversely to the travel direction of the lidding sheet and opposite at least one of the coils, wherein a transport channel for the lidding sheet is formed between the at least one coil and the magnetic-field influencing elements, the at least one coil being on a first side of the transport channel for the lidding sheet and the magnetic-field influencing elements being on a second side of the transport channel for the lidding sheet opposite the first side, and wherein a distance between each of the magnetic-field influencing elements and the at least one coil is adjustable by an actuating drive independently for each of the magnetic-field influencing elements;
    a plurality of temperature sensors arranged transversely to the travel direction of the lidding sheet and downstream of the magnetic-field influencing elements to detect a temperature profile of the lidding sheet; and
    a control unit which, on the basis of measurement values supplied by the temperature sensors, serves to regulate the temperature profile of the lidding sheet by changing the distance between the individual magnetic-field influencing elements and the at least one coil.

2. The device of claim 1 wherein the control unit is adapted to regulate automatically the temperature profile of the lidding sheet by changing the distance of the coils from the magnetic-field influencing elements.

3. The device of claim 2 wherein the control unit is adapted to regulate automatically the temperature profile of the lidding sheet by changing a current passing through one or more of the coils.

4. The device of claim 1 wherein each of the coils is wound around a magnetic core.

5. The device of claim 4 wherein the magnetic core is an E-shaped ferrite core.

6. The device of claim 1 wherein each coil has windings extending at least over a width of the lidding sheet.

7. The device of claim 6 wherein the windings of each coil extend substantially parallel to the travel direction of the lidding sheet.

8. The device of claim 1 wherein the magnetic-field influencing elements are arranged next to each other in a row.

9. The device of claim 1 wherein the temperature sensors are arranged next to each other in a row.

10. The device of claim 1 wherein power densities of the coils are different and the control unit is adapted to regulate a current passing through each of the coils individually.

11. The device of claim 1 wherein the actuating drive of the magnetic-field influencing elements is a servo motor, a stepping motor, a shape-memory alloy actuator, or a hydraulically or pneumatically driven actuator.

12. The device of claim 1 wherein the control unit is adapted to regulate automatically the temperature profile of the lidding sheet as a function of the speed of the sheet.

13. The device of claim 1 wherein the magnetic-field influencing elements are ferrite elements.

14. The device of claim 1 wherein the temperature sensors are infrared sensors.

* * * * *